(12) United States Patent
Mercurio

(10) Patent No.: US 7,748,775 B2
(45) Date of Patent: Jul. 6, 2010

(54) ADJUSTABLE REAR LOAD FLOOR FOR A HYBRID VEHICLE

(75) Inventor: Joseph F. Mercurio, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/248,075

(22) Filed: Oct. 9, 2008

(65) Prior Publication Data

US 2010/0090502 A1 Apr. 15, 2010

(51) Int. Cl.
*B60R 5/04* (2006.01)

(52) U.S. Cl. .............................. 296/193.07; 296/24.44; 296/37.14; 224/517

(58) Field of Classification Search ............... 296/24.33, 296/24.44, 24.3, 187.08, 191, 193.07, 37.14; 224/403, 502, 504–508, 517, 329, 330, 542
See application file for complete search history.

(56) References Cited

U.S. PATENT DOCUMENTS

| | | | | |
|---|---|---|---|---|
| 2,889,097 | A * | 6/1959 | Broehl | 224/542 |
| 3,291,520 | A * | 12/1966 | Smith | 296/24.44 |
| 4,261,611 | A * | 4/1981 | Barry et al. | 296/100.1 |
| 5,169,200 | A * | 12/1992 | Pugh | 296/37.6 |
| 5,598,962 | A * | 2/1997 | Schlachter | 224/542 |
| 5,669,537 | A * | 9/1997 | Saleem et al. | 224/539 |
| 6,050,202 | A * | 4/2000 | Thompson | 108/44 |
| 6,662,891 | B2 * | 12/2003 | Misu et al. | 180/68.1 |
| 6,733,060 | B1 * | 5/2004 | Pavkov et al. | 296/37.16 |
| 6,921,119 | B2 * | 7/2005 | Haspel et al. | 296/24.4 |
| 7,281,743 | B2 * | 10/2007 | Weiland | 296/24.44 |
| 7,401,716 | B2 * | 7/2008 | Svenson et al. | 224/42.32 |
| 7,503,610 | B2 * | 3/2009 | Karagitz et al. | 296/37.16 |
| 7,543,872 | B1 * | 6/2009 | Burns et al. | 296/26.09 |
| 2001/0030069 | A1 * | 10/2001 | Misu et al. | 180/68.1 |
| 2003/0098591 | A1 * | 5/2003 | Leitner et al. | 296/37.6 |
| 2005/0099033 | A1 * | 5/2005 | Chverchko et al. | 296/100.09 |
| 2008/0179907 | A1 * | 7/2008 | Medlar et al. | 296/37.1 |
| 2008/0274397 | A1 * | 11/2008 | Watanabe | 429/99 |
| 2009/0039679 | A1 * | 2/2009 | Karagitz et al. | 296/193.07 |

FOREIGN PATENT DOCUMENTS

JP 2001294048 A * 10/2001
WO WO-03/104035 A1 * 12/2003

* cited by examiner

*Primary Examiner*—Jason S Morrow
(74) *Attorney, Agent, or Firm*—Quinn Law Group, PLLC

(57) ABSTRACT

A vehicle includes a vehicle body which includes a storage area at the rear of the vehicle. A load floor located in the storage area is moveable between a first position and a second position relative to a stationary floor also located in the storage area.

15 Claims, 3 Drawing Sheets

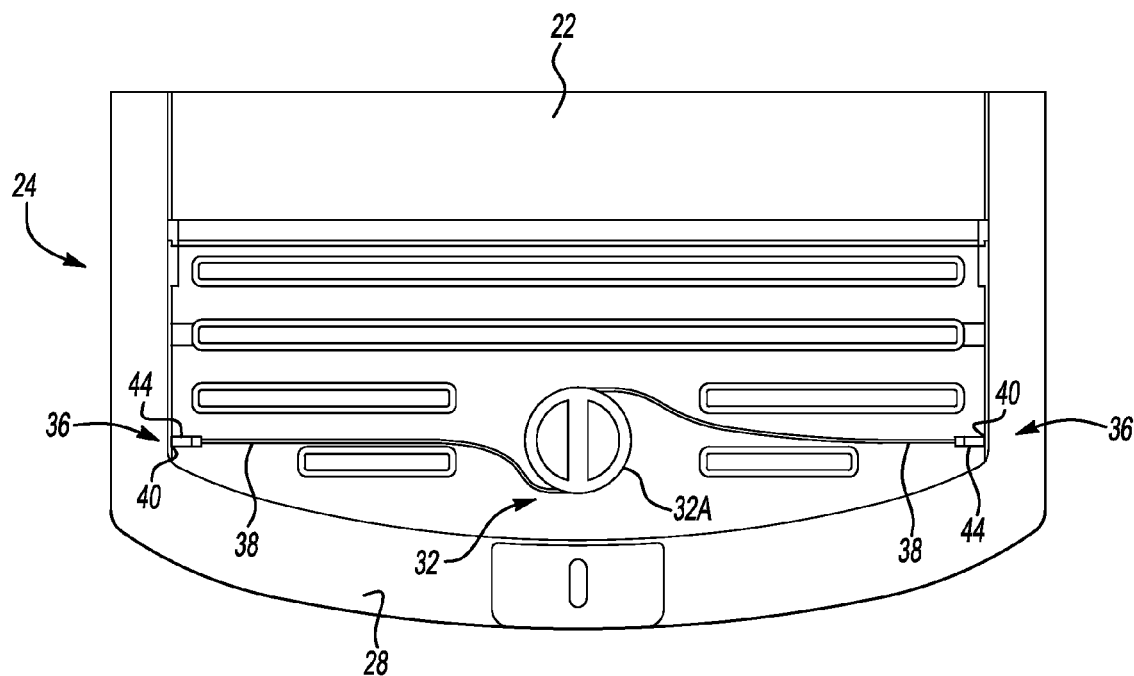
_Fig-3_
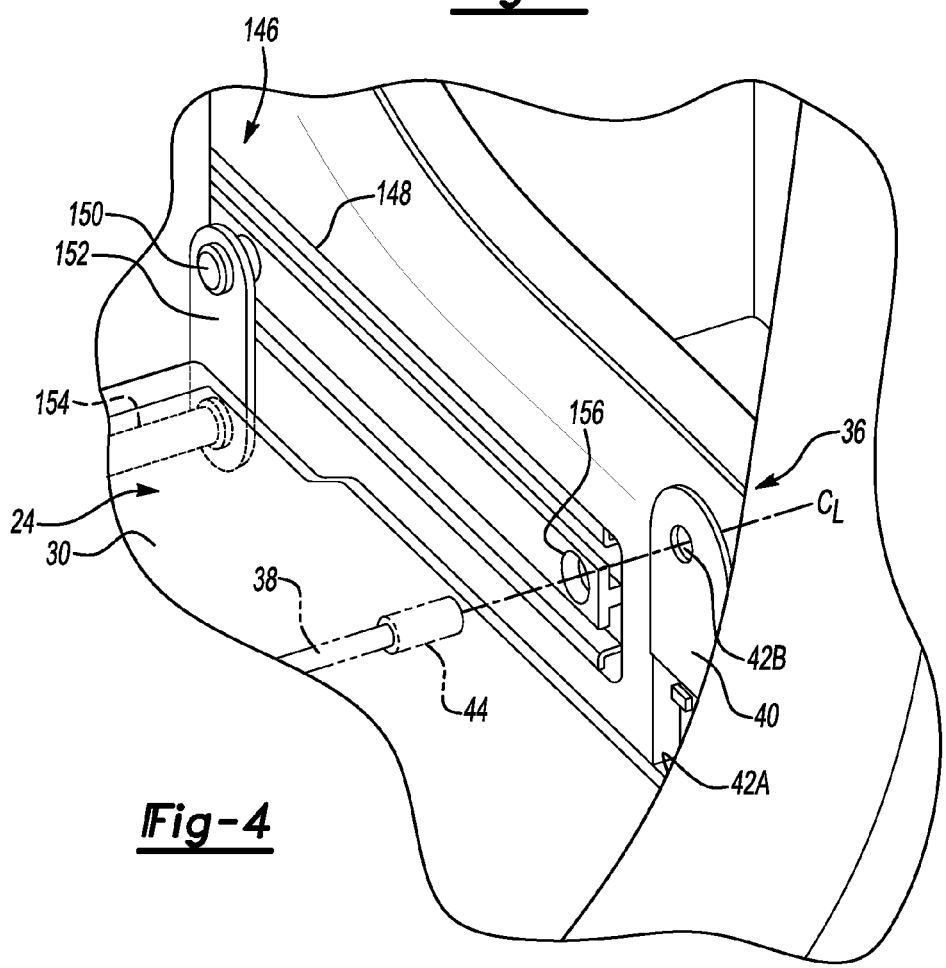
_Fig-4_

ADJUSTABLE REAR LOAD FLOOR FOR A HYBRID VEHICLE

TECHNICAL FIELD

The present invention relates, generally, to a hybrid vehicle, and more specifically, to an arrangement of a floor for a rear storage area for the hybrid vehicle.

BACKGROUND OF THE INVENTION

Hybrid vehicles include a battery connected to motor/generators within the transmission to increase the fuel economy of the vehicle. Because of the size of the battery required, it must be located remotely from the engine compartment. Additionally, in order for maintenance, including access to the battery for recharging, the battery must be placed in an accessible location. As a result, the battery is commonly located in a rear storage area of the vehicle.

Although the battery is large enough to require a remote location from the engine compartment the entire square footage of the storage area is typically not covered by the battery, resulting in an uneven floor. The uneven floor makes loading and moving large objects in the storage area awkward. In addition, raising the entire floor of the storage area to store the battery beneath results in a loss of storage space.

SUMMARY OF THE INVENTION

A vehicle that provides an adjustable load floor in a storage area is desired. A vehicle includes a vehicle body which has a storage area at the rear of the vehicle. A load floor located in the storage area is moveable between a first position and a second position. One of the positions aligns the load floor with a door sill for the storage area. The other position aligns the load floor with a stationary floor located in the storage area.

A method of adjusting the load floor includes releasing a locking mechanism that is located between the load floor and the vehicle from a first locking position. Once the locking mechanism is released the load floor is rotated about a hinge mechanism to move the load floor from a first position to a second position. When the load floor is in the second position the locking mechanism is secured in a second locking position which corresponds to the second position of the floor.

The above features and advantages, and other features and advantages of the present invention will be readily apparent from the following detailed description of the preferred embodiments and best modes for carrying out the present invention when taken in connection with the accompanying drawings.

BRIEF DESCRIPTION OF THE DRAWINGS

FIG. 3 is a schematic fragmentary top view of the load floor of FIGS. 1 and 2 having the load floor located in the first position;

FIG. 4 is a schematic perspective fragmentary illustration of a hinge for the load floor of FIGS. 1-3 having the load floor located in the first position;

DESCRIPTION OF THE PREFERRED EMBODIMENTS

Figure 1:
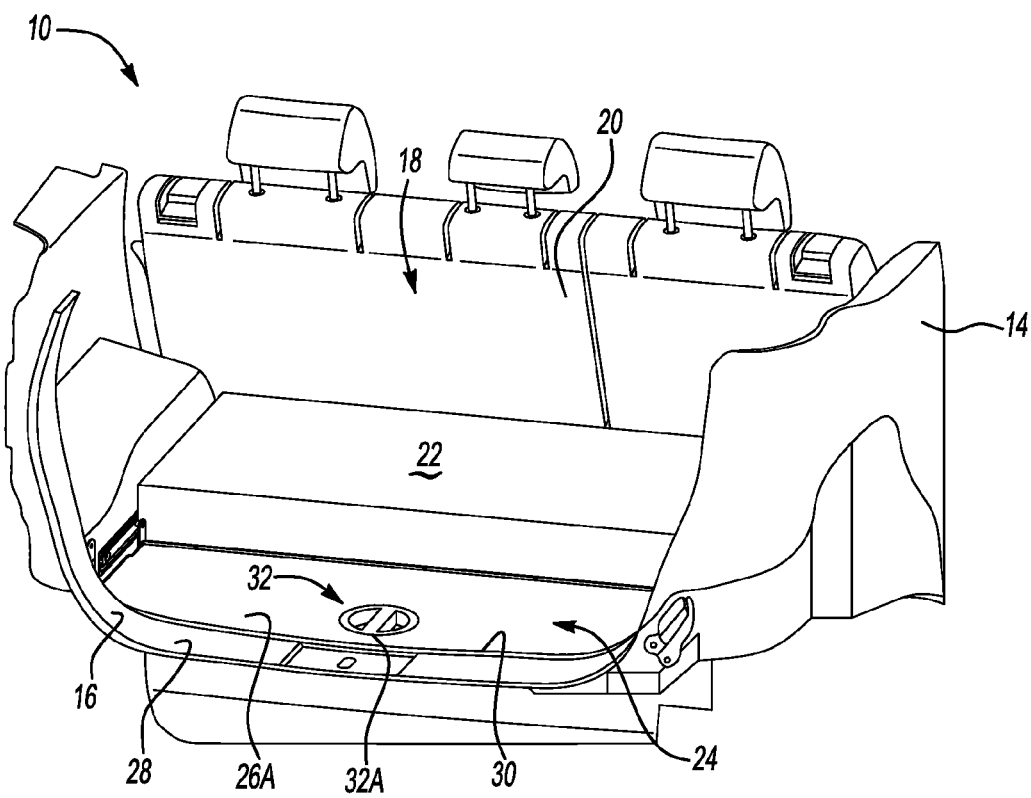
FIG. 1 is a schematic perspective fragmentary illustration of an automotive vehicle having a load floor located in a first position.

Referring to the Figures, wherein like reference numbers refer to the same or similar components throughout the several views, FIG. 1 schematically illustrates an automotive vehicle 10 having a vehicle body 14 defining a rear door opening 16. A storage area 18 defined by the vehicle body 14 and a vehicle seat 20 is accessible through the rear door opening 16. A battery pack 22 is located in the storage area 18. The battery pack 22 forms a stationary floor for the storage area 18. The battery pack 22 is connected to a hybrid powertrain (not shown) for the vehicle 10. The battery pack 22 is preferably positioned at the forward end of the storage area 18 adjacent to the vehicle seat 20. Directions relative to the vehicle 10 orientation may be used throughout the description regarding location of the components within the vehicle 10. Thus, the forward direction would be toward an engine compartment for the vehicle 10.

The storage area 18 includes a load floor 24. The load floor 24 is in a first position 26A between the battery pack 22 and a door sill 28. The load floor 24 includes a floor covering 30. The floor covering 30 is preferably carpet. Preferably, a separate piece of the floor covering 30 also covers the battery pack 22. In the first position 26A the load floor 24 is horizontal and parallel with the door sill 28. The load floor 24 includes a release handle 32. The release handle 32 is shown in a locked position 32A.

Figure 2:
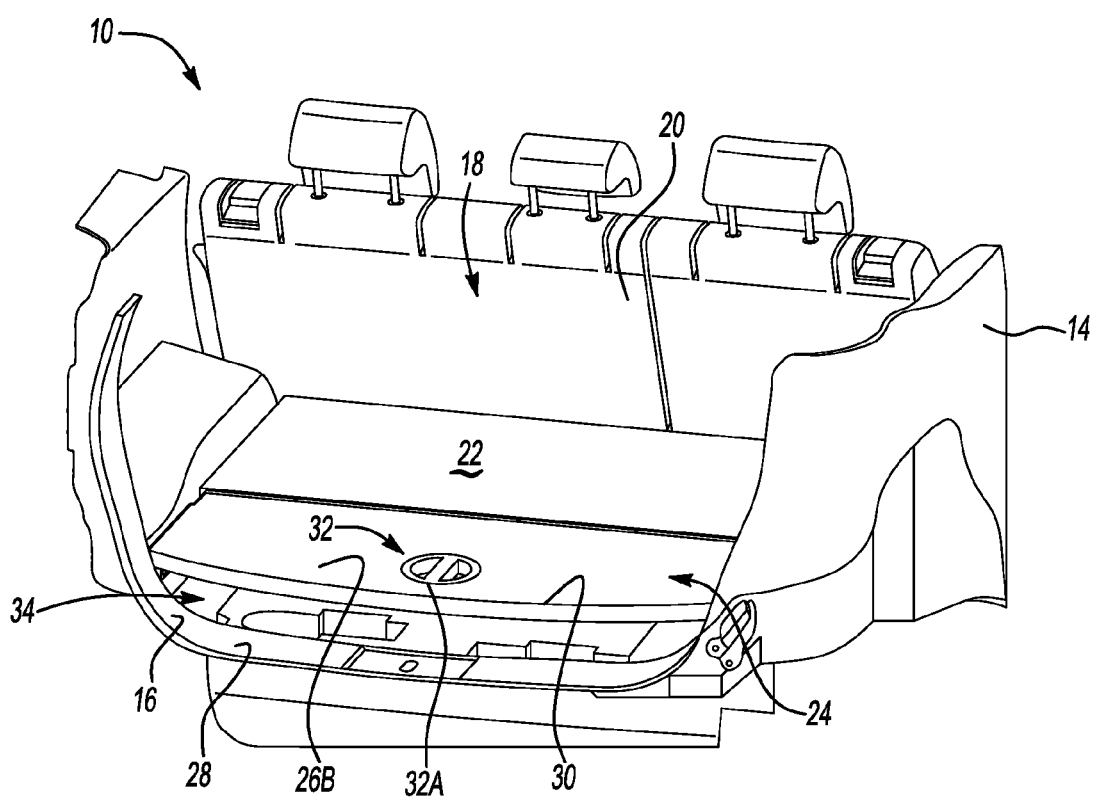
FIG. 2 is a schematic perspective fragmentary illustration of the automotive vehicle of FIG. 1 having the load floor located in a second position.

FIG. 2 a schematic perspective illustration of the automotive vehicle 10 with the load floor 24 located in a second position 26B. The second position 26B places the load floor 24 in a horizontal position that is elevated position relative to the first position 26A (shown in FIG. 1). The second position 26B preferably aligns the load floor 24 with the top of the battery pack 22, such that, the load floor 24 and a top surface of the battery pack 22 are level with one another. Again, the release handle is shown in the locked position 32A.

The load floor 24 may also be moved to an open position (not shown) to access a battery charge area 34. That is, the load floor 24 may be rotated upward from the second position 26B about a pivot axis at a forward edge of the load floor 24. The battery charge area 34 is located below the load floor 24 and may contain a plug-in cord for charging the battery pack 22. Additionally, a tire inflator or repair kit may also be located in this area.

Referring to FIGS. 3 and 4 a locking mechanism 36 for the load floor 24 will be explained. FIG. 3 shows a schematic top view of the storage floor 24 when the storage floor 24 is in the first position 26A of FIG. 1. The floor covering 30 (shown in FIG. 1) has been removed. Locking rods 38 extend from the release handle 32 to the locking mechanisms 36 located on either side of the vehicle 10 at the rear of the storage area 18. In the embodiment shown the locking mechanisms 36 include brackets 40. Only one locking mechanism 36 is shown in FIG. 4, another locking mechanism 36 is located on an opposing side of the vehicle 10 and operates in a similar manner as explained herein.

The brackets 40 include locking apertures 42A, 42B. A lower locking aperture 42A corresponds to the first position 26A which is the lower position. An upper locking aperture 42B corresponds to the second position 26B, which is elevated compared to the first position 26A. The locking rods 38 include fittings 44 which are inserted into the locking apertures 42A, 42B to lock the load floor 24 in the desired position. FIG. 3 illustrates the fittings 44 in the locking apertures 42A corresponding to the first position 26A. To move the load floor 24 from the first position 26A to the second position 26B (shown in FIGS. 2 and 6) the release handle 32 is rotated, counter-clockwise, to move the fittings 44 from the locking apertures 42A. The load floor 24 is rotated and lifted to the second position 26B and the release handle 32 is released. Spring loading (not shown) in the release handle 32 moves the locking rods 38 toward the sides of the vehicle 10. Fittings 44 are aligned with and moved into locking apertures 42B to retain the load floor 24 in the second position 26B. Although the load floor is in the first position 26A, the locking rods 38 and fittings 44 are shown in phantom in FIG. 4 to illustrate alignment of the fittings 44 with the locking apertures 42 as would occur when the load floor 24 is in the second position 26B.

Figure 5:
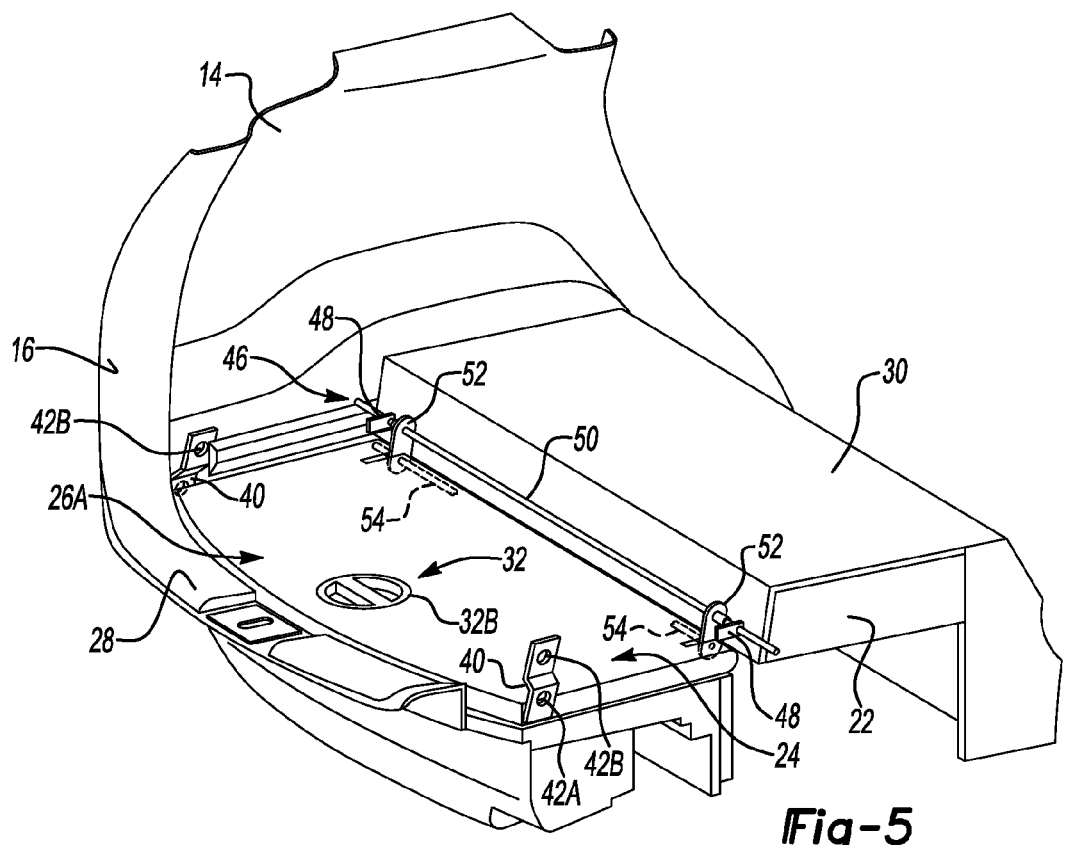
FIG. 5 is a schematic perspective fragmentary view of the load floor of FIGS. 1-4 having the load floor located in the first position.
Figure 6:
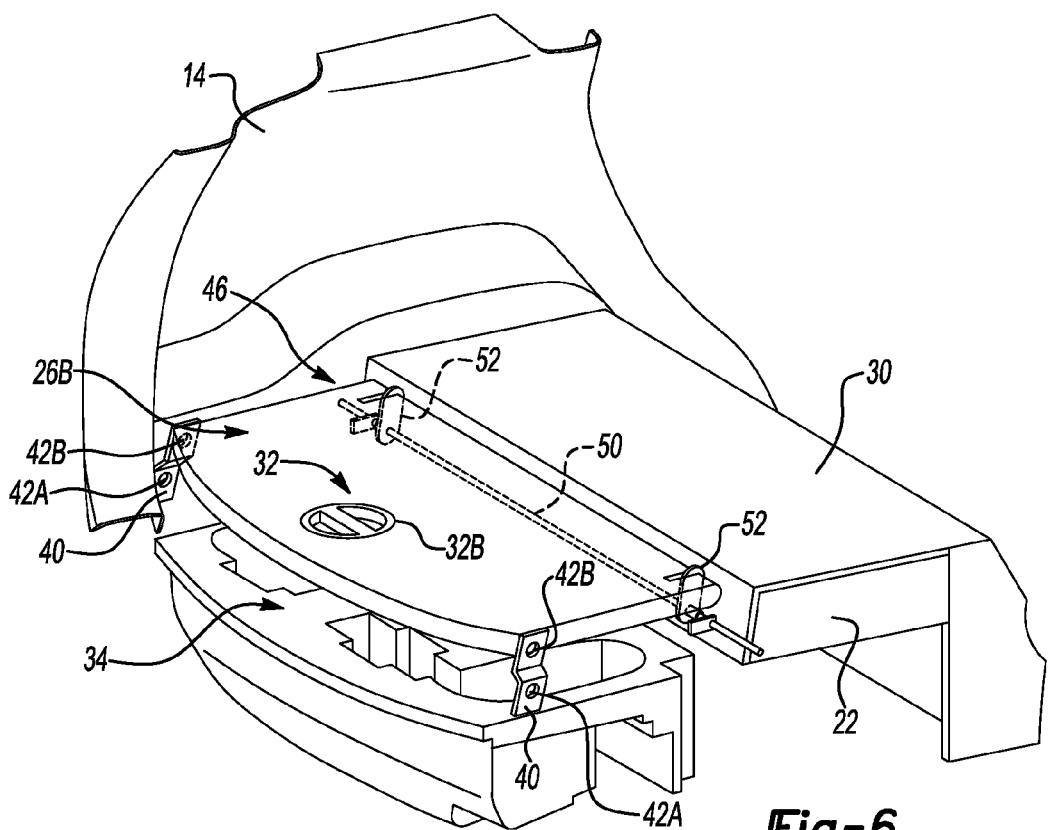
FIG. 6 is a schematic perspective fragmentary view of the load floor of FIGS. 1-5 having the load floor located in the second position.

Referring to FIGS. 5 and 6 an embodiment of the hinge mechanism 46 for moving the load floor 24 is explained. In FIG. 5 the load floor 24 is in the first position 26A. The fittings 44 are aligned within the lower locking apertures 42A (The fittings are not received within the lower locking apertures 42A as the locking mechanism 32 is shown in the released position 32B). The hinge mechanism 46 includes two hinge mounts 48 secured to the battery pack 22. The hinge mounts 48 include a hinge rod 50 extending between them. The hinge rod 50 can rotate relative to the hinge mounts 48. At each end of the hinge rod 50 adjacent the hinge mounts 48 are extensions 52 rotatably connecting the load floor 24 to the hinge rod 50. When the load floor 24 is in the first position 26A the extensions 52 extend downward from the hinged rod 50 to the load floor 24. Floor pins 54 secure the extensions 52 to the load floor 24 while allowing rotation of the load floor 24 relative to the extensions 52.

The locking mechanism 32 is in the released position 32B. The load floor is lifted upward to rotate the load floor 24 about the hinge rod 50. The hinge rod 50 rotates within the hinge mounts 48 to accommodate this movement. As can be seen from FIG. 6 when the load floor 24 is in the upper position 26B the extensions 52 extend upward from the hinge rod 50 to the load floor 26.

Alternatively, another embodiment of a hinge mechanism 146 is illustrated in FIG. 4. Only one hinge mechanism 146 is shown in FIG. 4, another hinge mechanism 146 is located on an opposing side of the vehicle 10 and operates in a similar manner as explained herein. A hinge mount 148 is attached to the vehicle body 14 at either side of the vehicle 10. Extensions 152 rotatably connected the load floor 24 to the hinge mount 148. The extension is connected to the hinge mount 148 with a hinge rod 150. The extensions 152 are rotatably connected to the floor with floor pins 154. The floor pins 154 may also be a solid rod from one side of the vehicle 10 to the other for additional support. The extensions 152 rotate relative to the hinge rod 150 and the floor pins 154 to allow the load floor 24 to move from the first position 26A FIG. 5 to the second position 26B of FIG. 6. The extensions 152 extend downward from the hinge rod 150 to the floor pins 154 when the floor is in the first position. The extensions 152 extend upward from the hinge rod to the floor pins 154 when the floor is in the second position 26B.

Additionally the hinge mount 148 may extend rearward within the vehicle 10 past the hinge mechanisms 146. The hinge mount 148 may include a hinge aperture 156 for receiving the fittings 44. The hinge aperture 156 in the hinge mount 148 provides additional support for the load floor 24 when in the second position 26B. The hinge aperture 156 is positioned to align with the locking aperture 42B such that the load floor 26B provides a surface that is co-planar to the battery pack 22. Therefore, the hinge aperture 156 may not be in vertical alignment with the hinge rod 150.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body at least partially defining a storage area;
a stationary floor located in the storage area;
a load floor located in the storage area and moveable between a first position and a second position relative to the stationary floor;
hinge mechanism adjacent the stationary floor and connected to the load floor to assist movement of the load floor from the first position to the second position;
wherein the load floor is horizontal and has generally the same horizontal surface area when secured in the first position and the second position, and the first position and the second position of the load floor are substantially vertically aligned with one another; and
wherein the load floor is moveable to provide access to a portion of the storage area that is located beneath the load floor when the load floor is in both the first position and the second position.

2. The vehicle of claim 1, wherein the second position of the load floor is elevated relative to the first position of the load floor.

3. The vehicle of claim 1, wherein the load floor is located rearward in the vehicle relative to the stationary floor.

4. The vehicle of claim 1, wherein the stationary floor further comprises a surface of a battery pack for the vehicle.

5. The vehicle of claim 4, further comprising a door sill for the vehicle body, wherein the load floor is level with the door sill when in the first position and wherein the load floor is level with a top of the battery pack when in the second position.

6. The vehicle of claim 1, wherein the hinge mechanism is located in an intermediate location between the first position of the load floor and the second position of the load floor, such that the hinge mechanism is located above the load floor when the load floor is in one of the first and the second positions and the hinge mechanism is located below the load floor when the load floor is in the other of the first and the second positions.

7. The vehicle of claim 1, further comprising a locking mechanism located on either side of the load floor configured to prevent rotational movement of the load floor in one of the first and the second positions.

8. A hybrid vehicle comprising:
a vehicle body at least partially defining a storage area;
a battery pack for the vehicle located in the storage area;
a load floor located in the storage area and moveable between a first position and a second position, wherein the load floor is parallel with a door sill of the vehicle body when in the first position and wherein the load floor is parallel with a top of the battery pack when in the second position;
a hinge mechanism adjacent the battery pack to assist movement of the load floor from the first position to the second position;
wherein the load floor has generally the same horizontal surface area when secured in the first position and the second position, and the first position and the second position of the load floor are substantially vertically aligned with one another; and a locking mechanism configured to selectively prevent rotational movement of the load floor.

9. The hybrid vehicle of claim 8, wherein the load floor is located rearward in the vehicle relative to the battery pack.

10. The hybrid vehicle of claim 8, wherein the hinge mechanism is located in an intermediate location between the first position and the second position, such that the hinge mechanism is located above the load floor when the load floor is the first position and the hinge mechanism is located below the load floor when the load floor is in the second position.

11. The hybrid vehicle of claim 8, wherein the locking mechanism is located on either side of the load floor to secure the load floor in one of the first and the second positions.

12. The hybrid vehicle of claim 8, wherein the load floor is moveable to provide access to an area located beneath the load floor when the load floor is in both the first position and the second position.

13. A method of adjusting a floor in a vehicle comprising:

providing a load floor in a vehicle, wherein the load floor is in a first position;

releasing a locking mechanism that is located between the load floor and a vehicle body from a first locking position;

rotating the load floor about a hinge mechanism to move the load floor from the first position to a second position such that the load floor has generally the same horizontal surface area when in the first position and the second position, and the first position and the second position are substantially vertically aligned with one another;

securing the locking mechanism in a second locking position which corresponds to the second position of the load floor; and wherein said rotating the load floor allows access to a portion of a storage area that is located beneath the load floor when the load floor is in both the first position and the second position.

14. The method of claim 13, wherein said releasing the locking mechanism further comprises rotating a release handle from a first position to a second position to move fittings connected to the release handle from within locking apertures attached to the vehicle body.

15. The method of claim 13, wherein rotating the load floor about the hinge mechanism further comprises one of moving the load floor in a downward direction such that the hinge mechanism is located above the load floor when the load floor is in one of the first and the second positions and moving the load floor in an upward direction such that the hinge mechanism is located below the load floor when the load floor is in the other of the first and the second positions.

\* \* \* \* \*